United States Patent Office 3,368,109
Patented Feb. 6, 1968

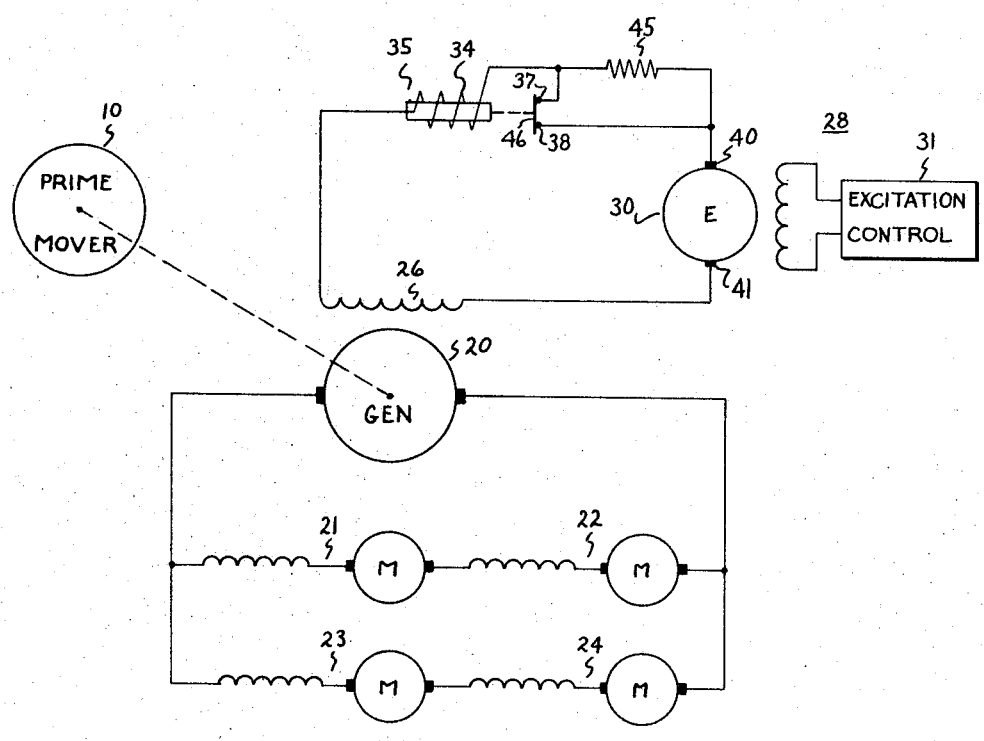

3,368,109
GENERATOR FLASHOVER PROTECTION CIRCUIT
ARRANGEMENTS
August V. Johansson, Erie, Pa., assignor to General
Electric Company, a corporation of New York
Filed June 15, 1965, Ser. No. 464,062
6 Claims. (Cl. 317—13)

ABSTRACT OF THE DISCLOSURE

A flashover protection circuit arrangement for a D-C generator wherein resistance is inserted in series with the shunt field winding thereof to reduce the generator excitation only when the current in such shunt field winding exceeds a preselected level, which level is an amount above the normally expected operating level.

---

This invention relates to generator flashover protection circuit arrangements and more particularly to a new and improved arrangement of such type which is operative to detect generator flashovers and provide corrective action to minimize generator damage resulting therefrom. Since this invention is especially suited for detecting and correcting flashovers in D-C railway traction generators, it will be particularly described in that connection.

One widely employed arrangement for detecting generator flashovers in railway vehicles, such as diesel-electric locomotives for example, utilizes a ground current detection relay which detects ground fault current resulting from generator flashovers. Thus, operation of such detecting arrangement depends upon the flashover arc going to ground. Since generator flashovers do not always go to ground and even when they do are often delayed in doing so, such prior art arrangements have not been entirely satisfactory. Moreover, it is more and more desirable, especially as larger traction generators are utilized, to both detect and correct such generator flashovers as rapidly as possible in order to minimize the damage to the generator as a result of such flashovers. Also, it has been found that even when ground fault current is produced due to a generator flashover such current is sometimes not of sufficient magnitude to actuate the ground current detecting relay so that some area of indecision is always present in such prior art arrangements. Further, ground faults very often occur in the railway vehicle high voltage power equipment making it necessary to provide means for disconnecting the ground detecting relay circuit in order to continue operation of the vehicle, leaving the generator at such times without any flashover protection whatever.

It is an object of this invention, therefore, to provide a new and improved generator flashover protection circuit arrangement which overcomes one or more of the prior art difficulties and is more reliable.

It is another object of this invention to provide a new and improved generator flashover protection circuit arrangement which is simple, inexpensive and capable of providing overload protection for the generator field circuit as well.

Briefly stated, in accordance with one aspect of the invention, I provide, in combination with a direct current generator whose field winding is supplied with electrical energy from an excitation system connected thereto, a generator flashover protection circuit arrangement which includes a current sensing means in circuit with the generator field winding for detecting a predetermined field current level which level is greater than the highest operating field current level. The flashover protection arrangement also includes means responsive to the detection of such predetermined field current level for adding resistance in series with said field winding to reduce the current supplied thereto.

The novel features believed characteristic of the invention are set forth with particularity in the appended claims. The invention itself, however, both as to its organization and method of operation, together with further objects and advantages thereof, may best be understood by reference to the following description taken in connection with the accompanying drawing wherein the sole figure thereof is a simplified schematic circuit diagram of an internally powered railway vehicle traction motor propulsion system.

As shown in the drawing, a prime mover 10, which may be a diesel engine, a gas turbine or the like, is arranged and adapted to drive a traction generator 20 which supplies electrical energy to a plurality of series traction motors 21, 22, 23 and 24. As illustrated, traction motors 21 and 22 are connected in series as are motors 23 and 24 and the two series combinations connected in parallel. As is well known, this is the usual connection for the acceleration mode with all motors being arranged to be connected in parallel for higher speed operation.

The shunt field winding 26 of generator 20 is supplied with electrical energy from a suitable excitation system designated generally at 28. Any suitable excitation system may be employed, such as for example the excitation system of the type disclosed and claimed in U.S. Patent 2,886,763, which patent is assigned to the same assignee as the present invention. The excitation system of that patent, for example, includes an exciter generator 30 and a control circuit 31 therefor. Thus, exciter generator 30 supplies the required electrical energy to the field winding 26 of traction generator 20.

Alternatively, an all-static excitation system, such as that disclosed and claimed in U.S. Patent 2,883,608, may be utilized. It will be understood that the excitation system per se is not part of the present invention and any system suitable for providing the required electrical energy to generator winding 26 may be employed. When an all-static system is employed, as distinguished from one which includes an exciter generator, it will be apparent that a current path should be provided therein, such as by employing a free wheeling diode device connected across the field winding, to assure a relatively low impedance path to permit an increased field current resulting from generator flashover to flow. The all-static excitation system of Patent 2,883,608 includes a suitable current path and therefore may be readily utilized in this invention.

It has been found that a sudden increase in armature current in a D-C shunt generator results in a large and sudden increase in field current. Accordingly, when a flashover occurs in the generator, the voltage at the terminals thereof is very suddenly reduced while at the same time there is a sudden increase in armature current. This sudden increase in armature current results by transformer action in a sudden large increase in field current.

In accordance with this invention I utilize the great increase in field current over normal steady state level when a flashover takes place to cause such field current to be reduced and thereby rapidly terminate the flashover and minimize damage to the generator as a result of such flashover. To this end, a current sensing means is connected in circuit with the field winding to detect the current level a predetermined amount greater than the normal steady state level. As shown, the coil 34 of a suitable relay 35 is connected in series circuit with the generator field winding 26 and, through the normally closed contacts 37 and 38 of relay 35, to the terminal 40 of exciter generator 30. The other end of field winding 26 is connected to exciter generator terminal 41. A resistance 45 is connected across normally closed contacts 37 and 38 so that when such contacts open, upon actuation of relay armature 46, resistance 45 is placed in series circuit with the generator winding 26.

In operation, assume initially that normal operating conditions prevail and no flashover is present. Relay 35 is adjusted so that its armature 46 will be actuated to open contacts 37 and 38 only when the field current reaches a value a preselected amount above the normal operating level. Conveniently, relay 35 may be adjusted so that its armature is actuated when the field current is at about 20% to 40% above normal.

Accordingly, in the absence of a flashover, generator field winding 26 is supplied with direct current from exciter generator 30 through a circuit which may be traced from terminal 40, contacts 37 and 38, relay coil 34, generator field winding 26 and to terminal 41 of exciter generator 30.

When a flashover occurs in generator 20, however, there is a sudden increase in its armature current which results in a very large and sudden increase in field current. This large increase in field current is sufficiently above normal steady state level so that the armature 46 of relay 35 is actuated. Actuation of relay armature 46 results in the opening of contacts 37 and 38 causing the resistance 45 to be inserted in series with the winding 26 to thereby cause the field current to be rapidly reduced and the flashover terminated.

The present invention offers circuit simplicity, economy of components and high reliability of operation and moreover any failure thereof tends to be in a "fail-safe" direction. When the preselected current level is exceeded due to a generator flashover, resistance is immediately inserted in series with the generator field winding and operates to rapidly reduce the field current to thereby terminate the flashover.

While only certain preferred features of the invention have been shown by way of illustration, many modifications and changes will occur to those skilled in the art. For example, although the current sensing means has been particularly illustrated as the coil of a relay device, it will be obvious to those skilled in the art that various devices are suitable for this purpose and that the illustration of a relay coil is not to be taken as placing any restriction or limitation on the invention. It is, therefore, to be understood that the appended claims are intended to cover all such modifications and changes as fall within the true spirit and scope of the invention.

What I claim as new and desire to secure by Letters Patent of the United States is:

1. In combination with a direct current generator having a shunt field winding and an excitation system connected to supply direct current to said shunt field winding, a flashover protection circuit arrangement comprising: a relay having its operating coil connected in series with said shunt field winding and having the contacts thereof normally closed and completing the connection of said shunt field winding to said excitation system, said relay contacts being actuated only when the current in said operating coil and hence the current in said shunt field winding exceeds a preselected value; resistance shunting said relay contacts so that when said contacts are opened said resistance is simultaneously inserted in series with said shunt field winding completing the circuit thereof to said excitation system and reducing the current in said field winding.

2. In combination with a direct current generator having a shunt field winding supplied with electrical energy from an excitation system connected thereto, a flashover protection circuit arrangement for said generator comprising: current sensing means in circuit with said generator shunt field winding for detecting a current level therein a preselected amount greater than the highest operating level; and means responsive to the detection of said current level for inserting resistance in series circuit with said field winding to reduce the current therein, said means shunting said resistance effectively out of the circuit in the normal mode of operation of said generator.

3. The flashover protection circuit arrangement of claim 2 wherein said current sensing means is a relay the operating coil of which is connected in series circuit with said field winding.

4. The flashover protection circuit arrangement of claim 1 wherein said preselected value of current in said shunt field winding is in the range of about 20% to 40% above the normally expected operating level.

5. The flashover protection circuit arrangement of claim 2 wherein the field current level to be detected by said current sensing means is from 20% to 40% greater than the highest operating level.

6. The flashover protection circuit arrangement of claim 5 wherein said current sensing means is a relay the operating coil of which is connected in series circuit with said field winding.

References Cited

UNITED STATES PATENTS

| | | | |
|---|---|---|---|
| 467,358 | 1/1892 | Rice | 322—68 X |
| 1,392,137 | 9/1921 | Fortescue | 317—20 X |
| 301,027 | 6/1884 | Weston | 322—17 |

MILTON O. HIRSHFIELD, *Primary Examiner.*

J. D. TRAMMELL, *Assistant Examiner.*